United States Patent [19]

Markham et al.

[11] Patent Number: 4,728,517

[45] Date of Patent: Mar. 1, 1988

[54] CONVERSION OF BIOLOGICAL SLUDGE AND PRIMARY FLOAT SLUDGE TO ANIMAL PROTEIN SUPPLEMENT

[76] Inventors: William M. Markham, P.O. Box 685, Verona, Va. 24482; John H. Reid, 1211 Caroline St., Fredericksburg, Va. 22401

[21] Appl. No.: 677,556

[22] Filed: Dec. 3, 1984

[51] Int. Cl.$^4$ .......................... A23K 1/04; A23K 1/10
[52] U.S. Cl. ........................ 426/53; 426/56; 426/807; 210/605; 210/608; 210/623; 210/631
[58] Field of Search .............. 426/53, 56, 635, 641, 426/656, 807; 210/608, 625, 631, 623, 605

[56] References Cited

U.S. PATENT DOCUMENTS

| | | | |
|---|---|---|---|
| 2,472,663 | 6/1949 | Kleine et al. | 426/807 |
| 2,679,477 | 5/1954 | Kivari et al. | 210/608 |
| 2,739,064 | 3/1956 | Miner, Jr. | 426/72 |
| 2,861,877 | 11/1958 | Geraghty et al. | 71/13 |
| 2,905,557 | 9/1959 | Degenhardt | 426/463 |
| 3,444,076 | 5/1969 | Sekikawa et al. | 210/625 |
| 3,549,010 | 12/1970 | Marsh et al. | 210/754 |
| 3,909,410 | 9/1975 | Neukamm | 34/9 |
| 4,001,114 | 1/1977 | Joseph et al. | 210/608 |
| 4,081,367 | 3/1978 | Hulls et al. | 210/625 |
| 4,200,524 | 4/1980 | Levin | 210/625 |
| 4,267,049 | 5/1981 | Erickson et al. | 210/631 |
| 4,282,256 | 8/1981 | Evich et al. | 426/7 |
| 4,339,265 | 7/1982 | Engelmann | 210/625 |
| 4,341,632 | 7/1982 | Gregor et al. | 210/608 |
| 4,361,590 | 11/1982 | Wojcik | 426/646 |
| 4,406,795 | 9/1983 | Kerey et al. | 210/771 |
| 4,407,717 | 10/1983 | Teletzke et al. | 210/631 |
| 4,452,699 | 6/1984 | Suzuki et al. | 210/608 |

FOREIGN PATENT DOCUMENTS 1200672 7/1970 United Kingdom ............... 426/646

OTHER PUBLICATIONS

"Development Document for Effluent Limitations Guidelines and New Source Performance Standards for the Renderer Segment of the Meat Products and Rendering Processing Point Source Category", EPA—440-/1-74/031-d, Group I, Phase II, 1975, pp. i, 66, 67, and 81–86.

Primary Examiner—R. B. Penland
Attorney, Agent, or Firm—Marion P. Lelong

[57] ABSTRACT

A process is described for producing an animal feed, comparable to feathermeal in properties and appearance, from two waste products: float sludge and activated sludge. The process uses a bulking agent for extracting excess fat from the sludges, particularly the float sludge, while a mixture of the sludges and the bulking agent is being stirred, heated, and dried. Blood, chicken litter, meat scrap, and the like can be substituted for activated sludge to provide protein. The bulking agent can be any material that can expose the sludges to air, that is capable of absorbing fat, and that can be separated from the dried and partially de-fatted sludges. Wood chips are the preferred bulking agent. Wood shavings, shredded cardboard, shredded newspaper, paunch manure, and the like can be substituted for wood chips as the bulking agent. More specifically, the process comprises: (a) admixing wood chips, float sludge, and activated sludge to form a mixture; (b) heating and tumbling the mixture until it is substantially dry; and (c) screening the dried mixture to produce a meal as the product and fat-impregnated wood chips as a byproduct. The meal is of high quality, having a fat content of less than 15% and a protein content of at least 40%.

33 Claims, 5 Drawing Figures

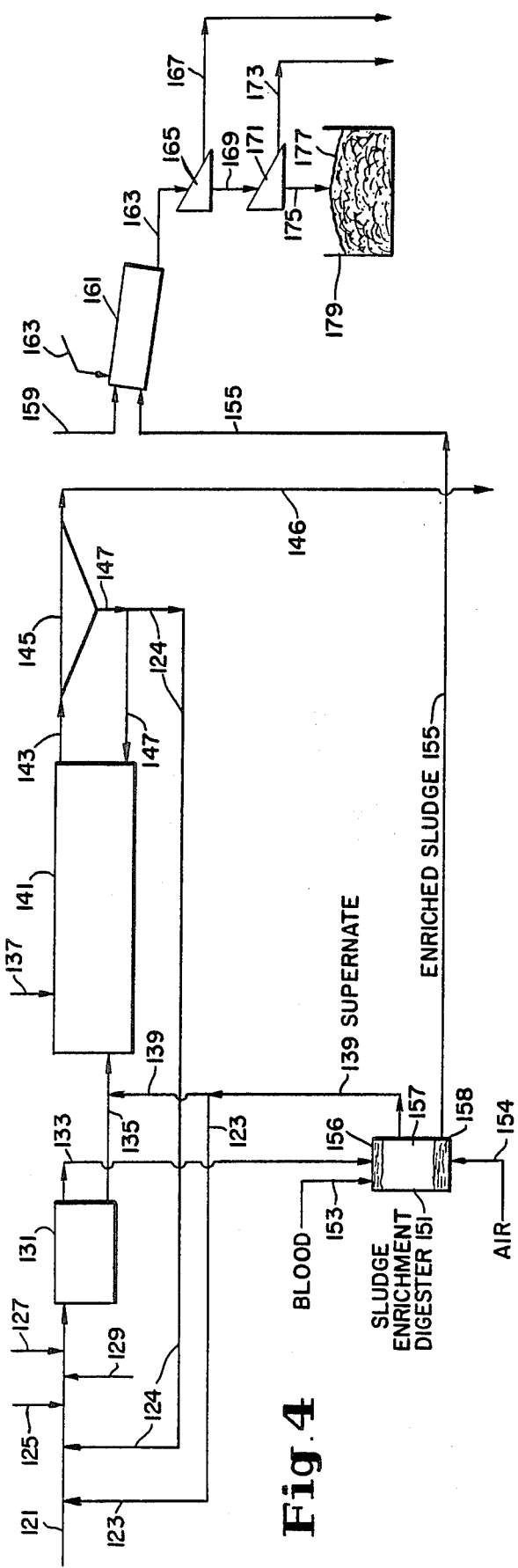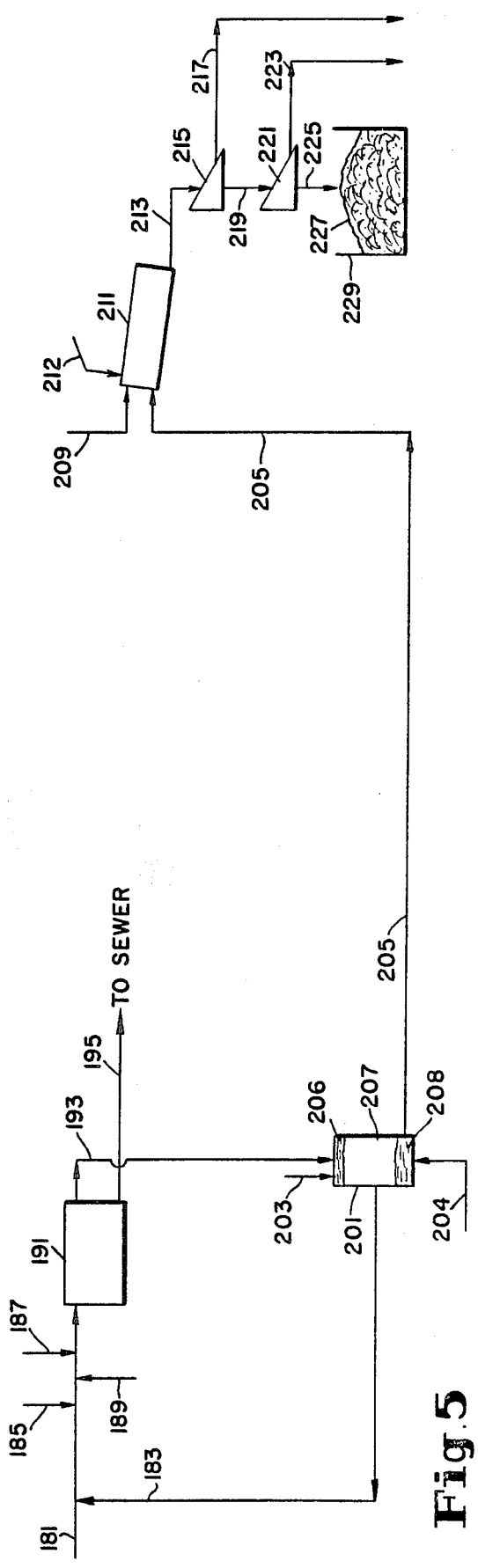

CONVERSION OF BIOLOGICAL SLUDGE AND PRIMARY FLOAT SLUDGE TO ANIMAL PROTEIN SUPPLEMENT

BACKGROUND OF THE INVENTION

1. Field of the Invention

This invention relates to dewatering sludges, particularly sludged derived from food processing. It also relates to separating fats and oils from proteinaceous materials. It further relates to preparing animal foods by separating unwanted components from aqueous sludges.

2. Review of the Prior Art

Biological sludges are herein defined as those sludges produced by conversion of carbonaceous, proteinaceous, and fatty matters and/or sugars and carbohydrates to biological solids (microorganisms including bacteria, fungi, protozoa, rotifers, and the like) by biological oxidation under facultative or aerobic conditions to create activated sludge or by biological reduction or fermentation under anaerobic conditions to create anaerobic sludge. Biological sludges include municipal or sewage sludge which is relatively easy to dispose of by land application or by drying and landfilling.

In fish canneries, slaughter houses, and poultry slaughter and processing plants, large amounts of food wastewaters, having high protein and fat contents, are produced. These wastewaters are commonly processed by: (a) pretreatment of the wastewaters in a dissolved air flotation process which is operated with or without chemical coagulants and flocculants and which produces a primary float sludge or skimmings and/or (b) biological oxidation under facultative or aerobic conditions or biological reduction or fermentation under anaerobic conditions to produce biological sludges. Addition of chemical coagulants and of flocculants in the dissolved air flotation process is preferred because they float additional proteins from the wastewater.

The float sludge produced by dissolved air flotation from poultry slaughtering operations, for example, is a complex substance which contains approximately 35-40% protein, 10% ash and fiber, and 40% fat on a dry basis and has a solids content ranging from 5% to 30% but normally averaging about 10-15%. It is similar to municipal or sewage sludge in many respects, such as having a low solids content of 2% to 8% by weight. The high fat content complicates the disposal process and increases its cost. If this float sludge is hauled in a tank truck to a land disposal site, spread on the land, and plowed under, the disposal cost is $30 to $50 or more for each 2,000 gallons of activated sludge. A poultry slaughtering plant handling 70,000 birds per day (17,500,000 birds per year) produces 2,200-2,500 gallons per day (500,000 gallons per year) of this float sludge which has a 12-15% solids content and costs 2-5¢ per gallon for disposal. This yearly disposal cost for float sludge is therefore $11,000 to $12,500 per year.

A poultry processing plant, for example, handling 70,000 birds (averaging about four pounds per bird) per day produces activated biological sludge from aerobic processing of its partially purified wastewater, after the float sludge has been removed therefrom, in the amount of approximately 4,000 gallons per day at 1% solids and 800 gallons per day of thickened sludge at 3-5% solids after passage through a flotation thickener. The annual costs of disposing of this activated sludge is $4,000. Thus the combined costs of disposing of both float and activated sludges is $15,000 to $16,500 per year.

Many attempts have been made to develop improved processes for disposing of both float and biological sludges. A large proportion of these attempts have involved the production of either an animal food and/or a cheaper or better fertilizer. None of these prior art processes appears to be suitable for converting float sludge into an animal feed supplement because each lacks a means and a step for removing excess fat from the protein and other desirable components. Cattle can digest feeds containing considerable proportions of cellulose, but they can utilize feeds containing no more than about 4% fat. Swine can utilize feeds containing no more than about 6-8% fat, and poultry can digest feeds containing up to about 14% fat.

The excessive fat content of such waste organic materials as float sludge is a problem in several industries, in addition to poultry slaughtering. Rendering plants, for example, discharge wastewaters averaging 1,660 mg/l of oil and grease, according to "Development Document for Effluent Limitations Guidelines and New Source Performance Standards for the RENDERER Segment of the MEAT PRODUCTS AND RENDERING PROCESSING Point Source Category", EPA-440/1-74/031-d, Group I, Phase II, 1975. Dissolved air flotation was reported therein as being the single most effective means for grease removal.

It is known, however, to thicken float sludge with sawdust as an aid in cooking it in a rotating dryer. In addition, wood chips have been added for the same purpose and to scour the dryer, commonly termed the cooker. Admixing a decomposable bulking agent, such as wood chips, bagasse, etc., with activated sludge for composting is also now practiced on a large scale.

U.S. Pat. No. 2,739,064 describes the use of dried activated sludge, when finely ground, as a component of poultry feeds for supplying the animal proteins that are usually available from fish solids.

U.S. Pat. No. 2,861,877 teaches the filtering of sewage sludge into a layer of loose, porous cellulosic material (preferably peat moss) that partially de-waters the sludge. The resulting mass of sludge and moss is tilled when its moisture content is 50-70%. The operation is repeated five times so that, after further drying to a moisture content of about 35%, the product has composted during the 20-day operation and contains 3 to 5 parts by weight of sewage sludge for each part of peat moss.

U.S. Pat. No. 2,905,557 deals with disposal of garbage before the large-scale usage of garbage disposers and paperboard containers. It proposes the admixing of an edible absorbent material, such as ground corn or wheat, corn cobs, corn stalks, hay, straw, or news print, with the garbage for absorbing the fats and oils in the garbage, for lubricating the surfaces of a heated drying griddle, and for conserving the food value of the fat when the dried mixture is utilized as animal feed.

U.S. Pat. No. 3,549,010 relates to treatment of municipal sludges, particularly primary sedimentation sludge, by admixing the slimy, gelatinous material with a pumpable slurry formed from municipal garbage and trash to form a free draining mixture containing more than 50 percent of fibrous constituents and 5 percent of sludge. This mixture is readily incinerated.

U.S. Pat. No. 3,909,410 describes a method for treating sewage sludge by distributing it onto preheated aggregate pieces to form a coating thereon. The coated aggregate is continuously fed into a rotating contactor drum until the coating becomes a hard encrustation which is pulverized, dislodged, and collected as dust. The decoated aggregate is recycled.

U.S. Pat. No. 4,282,256 discloses a method for preparation of an animal feed supplement in particulate form by recovering animal feed values from fish cannery wastewater. The concentrated sludge, separated from the water in a flotation cell maintained under aerobic conditions, is dewatered, blended with an animal-edible carrier, and dried under vacuum. Suitable carriers include brewer's yeast residue, spent brewer's grain, nuts and oilseed press cake meals, cottonseed meal, chopped hays, alfalfa, coarse ground corn cobs, rice hulls, beet pulp, bagasse, and the like.

U.S. Pat. No. 4,406,795 relates to a process for treating the wastewaters of high protein and fat content (i.e., in slurry form) from slaughtering houses, canning industries, organotherapeutic drug production, and the like. The slurry is ground very fine, is heated to a temperature of 50°–125° C. during a period of up to 2 minutes, is maintained at this temperature for at least 2 minutes and preferably for 5–13 minutes, and is filtered at this temperature, during at least 4 minutes and preferably 8–15 minutes, to separate aggregated and dewatered grains from water and melted fat. The filtered grains are then dried.

None of these prior art processes, however, has successfully solved the problem of removing excess fat from a sludge produced from the wastewater of a food preparation plant and then utilizing the defatted sludge as a proteinaceous animal food supplement. The cost of disposing of such sludges and the value of such food supplements indicates that there is a nationwide and longstanding need for a suitable defatting and protein enriching process that can thereby produce a nutritional animal food supplement.

SUMMARY OF THE INVENTION

It is accordingly an object of this invention to provide a process for converting float sludge into a nutritional animal feed supplement.

It is a further object to provide a process for biologically altering the proportion of fat to protein in the float sludge.

It is another object to provide a process for forming a mixture of float sludge and biological sludge and to convert this mixture into an animal feed supplement.

It is also an object to provide a process for removing a selected portion of the fatty substances within the float sludge.

It is an additional object to provide a process whereby the removed fatty substances can be utilized as fuel.

According to these objectives and the principles of this invention, a basic conversion process is herein provided for forming a primary float sludge from a food wastewater containing protein and fats by admixing air under pressure plus coagulation and flocculation chemicals, treating the remaining wastewater to form a biological sludge, mixing the biological sludge with the float sludge, aerating and cooking the mixed sludges while extracting a sufficient portion of the fat therefrom with a bulking agent and drying the cooked and partially defatted sludge to form a dried mixture having a coating on the bulking agent, and separating the dried coating from the bulking agent to form a meal. This meal should be at less than 12% moisture (preferably 4–10% moisture by weight), contain at least 40% protein by weight, and no more than 20% fat by weight at a respective weight ratio of 2:1 of protein:fat for poultry feed. The fat-saturated bulking agent typically contains 14–18% fat by weight. If the bulking agent is an organic material, it can be burned to recover its fuel value. Blood, chicken litter, meat scrap, and the like can be substituted for activated sludge to provide protein.

A suitable drying means is a steam cooker of the type usually used for rendering of meat scrap or feather meal. Reaching a moisture content of 4–10% usually requires about 5–6 hours.

A suitable separation means for the cooked blend of sludges and chips is a two-stage screen of 1/16 inch to ¼ inch. Preferably, the No. 1 screen has ¼-inch openings and the No. 2 screen has 1/16-inch to ⅛-inch openings. The wood chips screened from the blend contain 15–16% fat by weight and have an average Btu value of 9,500 Btu/pound, as compared to 6,370 Btu/pound for raw wood chips (hardwood).

As an improvement on the basic process, an activated sludge recycling process is provided that comprises recycling activated sludge to the food wastewater, before introduction of air under pressure and of chemicals at the entrance to the flotation cell. This sludge recycling process creates additional protein enrichment by enabling the activated sludge to absorb blood and other dissolved proteins that are in the food wastewater, including selectively added blood. Such absorption is useful in combination with any acidified polymer because the chemicals remove the blood and other soluble proteins with the attached sludge particles.

A protein-enrichment process is also provided that increases the proportion of protein to fat. This process comprises aerobically digesting the skimmed float sludge for a period of at least three days to form a protein-enriched sludge layer and a supernate or clear liquor. The protein-enriched sludge is then mixed with the bulking agent, aerated, heated, partially defatted and dried, and separated from the bulking agent to form a meal. The supernate is recycled to the inlet food wastewater to form part of the feed to the float cell. The partially purified wastewater from the float cell is sewered.

As an improvement thereon, a protein enrichment/-sludge recycling process is provided by recycling up to about one-half of the supernate to the food wastewater, before introduction of air under pressure and of chemicals, at the entrance to the flotation cell. A portion of the supernate and all of the partially purified wastewater from the float cell is discharged to an activated sludge basin from which mixed liquor is delivered to a clarifier. Part of the activated sludge from the clarifier is also recycled to the food process wastewater.

Preferably, the food wastewater from a protein-and-fat processing plant, such as a slaughterhouse, poultry plant, or fish cannery, passes through a flotation cell, to which a coagulation agent, compressed air, and then a flocculation agent are preferably added to form a pressurized liquid mixture which is delivered to float cell which is under atmospheric pressure. As tiny air bubbles are released from the decompressed wastewater/air mixture, they attach to and float globules of fat and protein particles to the surface where they are skimmed from the underlying liquid and pushed to a discharge port at one side of the cell. The partially purified liquid is discharged to an aerobic treatment plant in which it is aerated and digested with aerobic microorganisms.

A suitable aerobic treatment plant is a barrier oxidation ditch in which a mineralized, activated sludge and a clarified liquor are produced by the activated sludge process. The activated sludge may be partially dehydrated, if desired, such as by exposure to air and sunlight in a drying bed which reduces moisture content by 65–70%.

The float and activated sludges and a bulking agent may then be fed directly to a drying means such as a cooker, which is preferably a rotating drum dryer but which can be any drying apparatus which stirs, heats, and aerates a wet material. The bulking agent can be any material which is: (a) capable of separating and aerating the mixed sludges while they are being cooked and dried, (b) able to absorb fat, and (c) capable of being separated from the dried and defatted sludges. The bulking agent can be an inorganic material or an organic material.

The particle size of the bulking agent is not critical, provided that separation is feasible. However, excessively large particles tend to have insufficient surface area for efficient fat absorption, and excessively small sizes tend to be difficult to separate from the dried sludges which are in the form of a coarse powder or meal. If the particles have a density close to the density of this meal, moreover, the particles sizes must be large enough for separation by screening. If the particles have a much higher density than the meal, air flotation or centrifugal separation is feasible in addition to screening. Smaller particle sizes are consequently feasible for such high-density materials.

Examples of inorganic materials having a usefully high density and adequate absorptive capacity are limestone, sandstone, pumice, tuff, and brick, as chips of about ⅜-inch in size, or aluminum oxide balls of at least ⅜-inch in diameter. If the meal is to be used as cattle or hog feed, such inorganic materials must be completely free of fines and not susceptible to powdering by abrasion. Aluminum oxide balls are, consequently, highly preferred for these animals. However, if the meal is to be used for feeding poultry, including chickens, ducks, and turkeys, grit from such abrasion is acceptable and even desirable, particularly if the material is limestone, sandstone, or mixtures thereof.

Examples of organic materials having usefulness as an absorbent and bulking agent are wood chips, wood shavings, shredded cardboard, shredded newspaper, whole or broken corn cobs, bark, peanut hulls, rice hulls, soybean hulls, paunch manure, some types of nut hulls, and cloth scraps if made of absorptive fibers such as cotton, linen, and wool. It is necessary that the organic material be substantially free of fines and have a particle size large enough for separation by screening, such as larger than 1/16-inch, unless there is sufficient density differential for other separation methods than screening, such as air separation. Cloth scraps can be re-used by passing the fat-saturated scraps through a press to obtain a low-grade oil.

A highly preferred improvement of the protein-enrichment process is to send the skimmed float sludge from the float cell to a digestion tank for aerobic digestion. After three or more days, this tank is about one-fourth filled with digested float sludge from a previously digested batch and another one-fourth filled with liquor which has been separated from this digested float sludge. When the tank is filled and blended, air bubbles are dispersed from a sparge which is disposed at the bottom of the tank.

After about three days of digestion in this manner at ambient temperatures, the digested material is allowed to settle for about two hours, producing half a tank full of digested sludge and half a tank full of separated liquor or supernate as two distinct layers, with a thin scum layer at the top. Half of each layer is drawn off, the digested sludge being sent to the cooker and the liquor being sent, entirely in one process embodiment and partially in another process embodiment, to the inlet food wastewater line, and the remaining liquor in the other embodiment being sent to the aerobic treatment plant for producing the activated sludge and clarified liquor for discharge to a river, lake, or other natural body of water.

The invention may be summarized as a conversion process for producing an animal supplement of high protein content and adequately low fat content from the wastewater of a proteinaceous food preparation plant, such as an animal or fish slaughtering, canning, or processing plant. This process comprises the following steps:

A. producing a float sludge, which contains protein and is high in sludge fat, and a liquid by air flotation of the wastewater;

B. producing an activated sludge from the liquid;

C. mixing the float sludge with the activated sludge and a bulking agent to form a bulked mixture;

D. heating and drying the bulked mixture, while absorbing a portion of the sludge fat with the bulking agent to form a dried mixture; and E. separating the fat-containing bulking agent in the dried mixture from the dried and partially defatted sludges that are in the form of a meal having utility as the animal supplement.

The process preferably includes these additional steps:

A. bubbling air through a quantity of the float sludge of the previous Step A for a period of several days, preferably at least three days, until the float sludge has been digested by microorganisms;

B. settling the digested float sludge to produce a digested sludge layer and a supernate layer;

C. transferring a portion of the sludge layer for mixing with the bulking agent of the previous Step C instead of the skimmed float sludge; and D. using a portion of the supernate for producing the activated sludge of the previous Step B, instead of using the liquid from the previous Step A.

As an alternative embodiment, the activated sludge may be recycled for admixture with the food wastewater before the wastewater is admixed with a coagulation agent, compressed air, and a flocculation agent. As another alternative embodiment, the activated sludge may be recycled for admixture with both food wastewater and supernate from the sludge enrichment digester. In general, 3–6% of activated sludge at 1% solids is preferably admixed with the food wastewater before adding the chemicals. On a dry basis, the activated sludge is at least 15% by weight of the combined sludge.

Blood may also be admixed with the food process wastewater if recycled activated sludge or supernate is being recycled thereto because the sludge furnishes biomass onto which protein molecules in the blood become attached in the flotation cell, and the relatively clear supernate, by a mechanism not yet understood, also provides a means for withdrawing proteins from the liquor and incorporating them in the sludge.

Blood and other proteinaceous materials may be added to the skimmed float sludge in the second Step A, whereby digestion of the mixed blood and float sludge causes the efficiency of protein removal to increase from about 60% to about 72%. By leaving one-half of the digested float sludge and one-half of the digested liquor in the digestion tank for mixing with the next batch of skimmed float solids, digestion is accomplished in three days instead of 8-10 days, the time required when all of the digested sludge and liquor are removed from the digestion tank.

For example, if the digester contains 2,000 gallons of held-over sludge and liquor and 2,000 gallons of skimmed sludge to produce 2,000 gallons of digested sludge as the bottom layer and 2,000 gallons of digested liquor as the supernate layer, 1,000 gallons of digested sludge are sent to the cooker and 1,000 gallons of float sludge are left behind for mixing with the next batch of skimmed float sludge. Similarly, 1,000 gallons of digested liquor are sent to the aerobic treatment plant and 1,000 gallons of liquor are left behind in the digester for mixing with the skimmed float sludge.

The purpose of aerobically digesting the skimmed float sludge is to increase the protein/fat ratio of the digested sludge. An additional benefit of the process is an increase in the settleability of the digested sludge which facilitates thickening or concentration of sludge solids in the digested sludge.

This process involves the collection of float sludge in large tanks which are fitted with compressed air diffusers, sparges, or similar devices for mixing and aerating the sludge. The tanks can be allowed to develop their own culture from microorganisms that exist in the sludge or can be seeded with biological cultures from mixed liquor of activated sludge systems. Preferably, after the initial run, half of each of the tank's two layers is allowed to remain in the tank for supplying seed to the next batch. Although settling for two hours is preferable, settling for 30-60 minutes is often satisfactory. Batch operation is quite satisfactory if two tanks are used alternately, but the process may be operated continuously by designing the storage tank with a 10-12 day retention time and by adding sludge continuously while making periodic withdrawals of supernatant liquor and digested sludge.

The process is based on the principle of biological oxidation of fat and its conversion to biomass which contains approximately 40% protein by weight of dry matter. For this reason, the process is best applied to sludges of low protein content (20% or less) and high fat content (40% or more). The process also lends itself well to the use of supplementary protein sources such as blood, because these protein sources are rapidly assimilated into and absorbed onto the biomass, leaving the liquid essentially blood-free or protein-source free and in condition to be decanted. Moreover, blood may be added directly to the aeration tank at any time after development of the initial culture. Carbohydrates may also be added to the sludge as a supplementary source of energy for biomass development or the process may be utilized for protein enrichment of high carbohydrate sludges (to increase the protein content and reduce the carbohydrate content).

The end product obtained from this float-sludge aeration process is a sludge which has a significantly increased protein content of approximately 30%. Tests demonstrated an increase of 9-10% in protein and a decrease of 7% in fat. In the same tests, the percentage of solids in the finished sludge was 2-3% greater than in the raw skimmed float sludge.

Once the desired protein/fat ratio is reached and the float sludge from the dissolved air flotation cells is decanted by gravity to reach the maximum solids concentration, the thickened sludge is drawn out and pumped into a cooker where it is mixed with a bulking agent, such as wood chips or shavings, before being cooked to produce a recoverable and marketable feed meal or supplement.

BRIEF DESCRIPTION OF THE DRAWINGS

FIG. 4 is a schematic flow sheet showing a protein enrichment/sludge recycling process which is still another embodiment of this invention in which a sludge enrichment digester is combined with the float cell and the activated sludge basin to provide feed for the cooker in the form of enriched sludge, the supernate being sent either to the sludge basin or to the wastewater for admixing therewith, and return sludge also being recycled, as in FIG. 3, to the wastewater.

FIG. 5 is a schematic flow sheet illustrating an additional embodiment of this invention, the protein-enrichment process, in which the sludge enrichment digester of FIG. 4 is combined with the float cell but without use of an activated sludge basin, so that clarified liquor from the float cell is sent to the sewer and the supernate from the sludge enrichment digester is recycled to the incoming wastewater, thus providing enriched sludge as cooker feed.

DESCRIPTION OF THE PREFERRRED EMBODIMENTS

Figure 1:
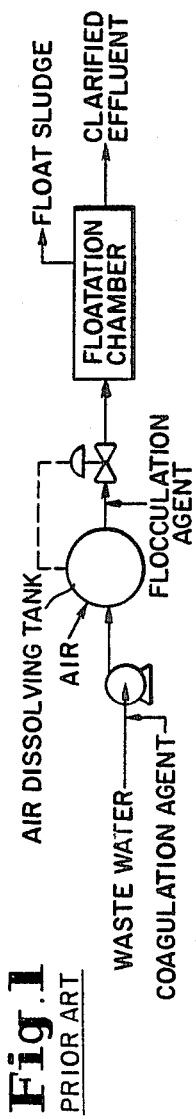
FIG. 1 is a schematic flow sheet showing the coagulating, air dissolving, flocculating, and float chamber operation of the prior art that produces a float sludge and clarifier effluent from a high-protein and high-fat food wastewater.

As seen in FIG. 1, the prior art process mixes a coagulation agent with a food process wastewater and under pressure dissolves air into this wastewater in an air dissolving tank which is controlled by a pressure control valve. The air-containing liquor from the air dissolving tank is then admixed with a flocculation agent and moves into a flotation chamber wherein float sludge rises to the top and is skimmed off to leave a clarified effluent therebelow.

Figure 2:
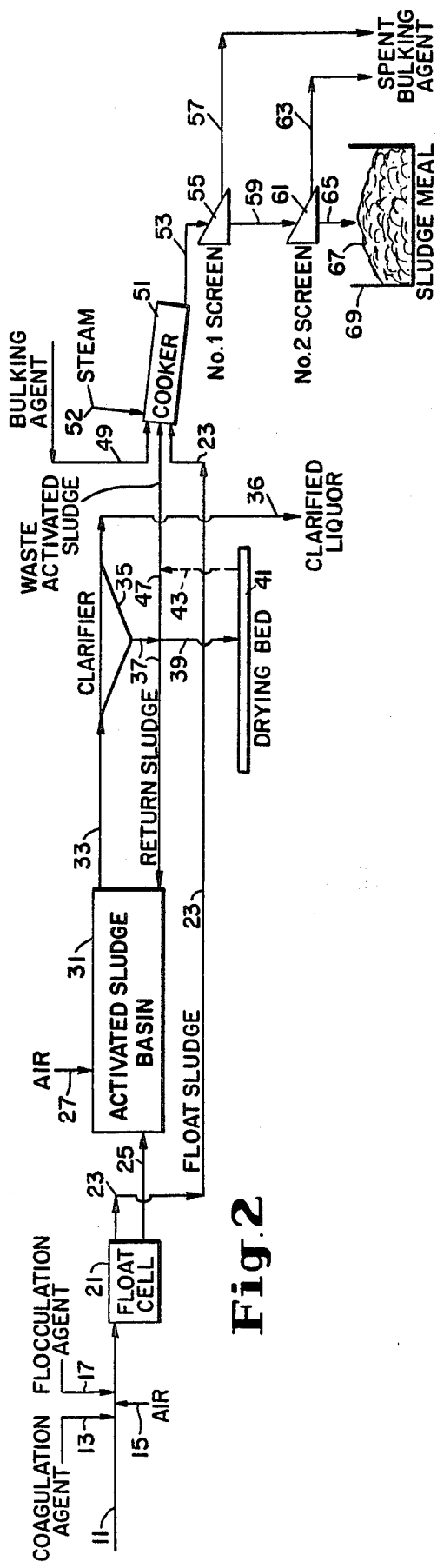
FIG. 2 is a schematic flow sheet of one embodiment of this invention that shows a basic conversion process for combining a float cell with an activated sludge basin, a clarifier, a cooker, and screens to produce a sludge meal and a spent bulking agent containing excess fat.

According to the basic conversion process of this invention as shown in FIG. 2, waste process water in line 11 from a poultry slaughtering plant receives a coagulation agent from line 13, compressed air from line 15, and a flocculation agent from line 17 to form a pressurized mixture which is fed to a flotation cell 21 which is at atmospheric pressure. Float sludge is skimmed from the surface of the mixture and is discharged through line 23. The partially purified wastewater is discharged as clarified effluent from cell 21 through line 23 and is fed to aerobic treatment basin 31 which produces activated sludge. A suitable basin is a barrier oxidation ditch. Air is fed to basin 31 through line 27.

Mixed liquor is discharged from basin 31 through line 33 and is fed to clarifier 35 wherein the sludge settles from the clear liquor and leaves clarifier 35 through line 37. The clarified liquor passes through line 36 to disposal, after suitable treatment with agents such as chlorine, to a natural receptacle such as a lake or river. The sludge in line 37 is sent back as return sludge to basin 31. However, a portion is customarily wasted by being sent to drying bed 41, as represented by line 39, and is then used as landfill or fertilizer. In this process, a portion of the sludge is sent directly through line 47 to cooker 51. The dried sludge in line 43 may alternatively be sent, as indicated by line 47, to cooker 51 and is preferable because dried sludge has less water to be removed by cooker 51 and is able to reach suitable temperatures with less added heat in cooker 51. A bulking agent, such as wood chips, is added to cooker 51 through line 49 for mixing with the float sludge in line 23, and the activated sludge in line 47.

In cooker 51, which receives heat from steam line 52, the materials are agitated, mixed, and aerated while being heated and slowly progressing toward the forward end of the cooker where they emerge as a dry, dusty, and pourable mixture in line 53 to be dropped onto the inclined surface of No. 1 screen 55 having openings of approximately ⅜ inch. A portion of the meal passes through the screen and through line 59 onto the inclined surface of No. 2 screen 61, having openings of approximately ⅛ inch, and from thence in direction 65 to form the piled-up sludge meal 67 in bin 69. The oversized material, as spent bulking agent having a small amount of powdered sludge meal attached to the surface thereof, passes from screen 55 through line 57 and from screen 61 through line 63 to suitable disposal.

Figure 3:
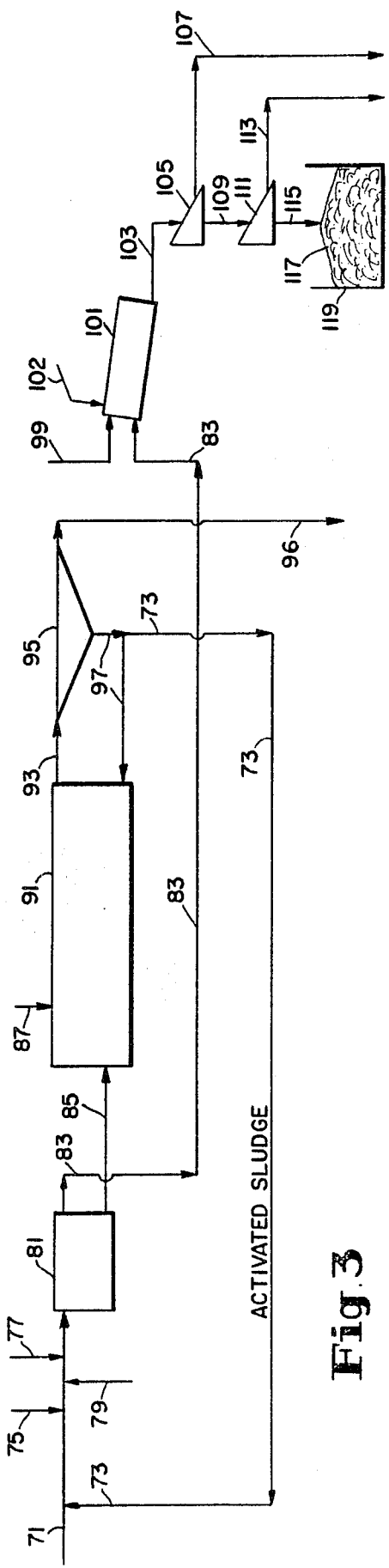
FIG. 3 is a schematic flow sheet showing an activated-sludge recycling process which is another embodiment of this invention for producing sludge meal and a spent bulking agent in which the return sludge is partially recycled to the incoming wastewater, prior to introduction of the coagulation agent, so that it is entirely incorporated in the float sludge sent to the cooker.

According to the activated sludge recycling process shown in FIG. 3, waste process water in line 71 from a poultry slaughtering or other food preparation plant, typically discharging abundant water with large amounts of protein and fat, receives return activated sludge through line 73, a coagulation agent through line 75, air through line 79, and a flocculation agent through line 77 to form a pressurized liquor/air mixture which is fed to float cell 81 wherein the pressure is released and the protein and fat particles are floated to the surface to form an augmented float sludge which is discharged through line 83 and sent to cooker 101. The partially purified wastewater is sent as clarified effluent from float cell 81 to activated sludge basin 91 which receives air through line 87. Treatment according to the activated sludge process in basin 91 produces a mixed liquor containing large amounts of bio-mass which is discharged through line 93 to clarifier 95 wherein sludge is settled and sent at least partially through line 97 to basin 91 as return sludge, the remainder being sent through line 73 as the activated sludge feed for admixture with the waste process water in line 71. The clarified liquor from clarifier 95 is discharged through line 96 to a suitable natural receptacle, such as a lake, pond, or river, after further treatment.

A selected bulking agent is added through line 99 to cooker 101 which is rotatably operated while receiving heat, as from a steam line 102, so that the mixture of augmented float sludge and bulking agent is heated, aerated, and thoroughly mixed. The fat in the float sludge is liquefied by the heat and penetrates and is absorbed by the bulking agent while the float sludge dries to form a highly particulate meal as a coating on the bulking agent, in cooker 101.

The mixture of meal and chips is discharged as stream 103 onto the inclined surface of No. 1 screen 105 from which a large-chip stream 107 is discharged. A mixture of small chips and meal passes through screen 105 as stream 109 onto the inclined surface of No. 2 screen 111 from which a meal product 115 and a steam of small chips 113 are discharged. The meal is received in bin 119 to form a pile of meal 117.

In the protein-enrichment/sludge recycling process shown in FIG. 4 a sludge enrichment digester is used for receiving augmented float sludge and, if desired, blood and for digesting and combining the sludge with the blood to form a concentrated sludge for use in the cooker and a supernate for feeding to the activated sludge basin.

In FIG. 4, waste process water from an animal food processing plant moves through line 121, receives a selected quantity of supernate in line 123, activated sludge in line 124, coagulation agent in line 125, air in line 129, and flocculation agent in line 127 to form a mixture which is fed to float cell 131. Protein and fat are skimmed to the surface as float sludge in cell 131 and fed through line 133 to sludge enrichment digester 151. When desired, blood is fed through line 153 to digester 151 for supplementing and mixing with the sludge.

The partially purified wastewater from float cell 131 is fed to basin 141 through line 135 which selectively receives supernate in line 139 from digester 151. Air is fed through line 137 to basin 141. Mixed liquor is discharged through line 143 to clarifier 145. Clarified liquor is discharged from clarifier 145 through line 146. Sludge is discharged from the bottom of clarifier 145 through line 147 to basin 141 as return sludge, and a portion of the settled sludge is fed as recycled activated sludge through line 124 to join line 121.

In sludge enrichment digester 151, bacteria use air fed through line 154 to concentrate the sludge and form a scum layer 156, a supernate layer 157 therebeneath, and a layer of enriched sludge 158 at the bottom of digester 151. The supernate leaves the digester through line 139 for feeding to basin 141 and/or to float cell 131 through line 123, and the enriched sludge leaves through line 155 to become a feed material for cooker 161. A bulking agent is also fed to cooker 161 through line 159.

As cooker 161 is heated by steam from line 163, the enriched sludge and bulking agent mix and tumble together while being aerated and dried, and the melted fat from the sludge penetrates and is absorbed by the chips or other bulking agent to enable the meal to become edible and pulverulent.

The mixture 163 of bulking agent and meal is discharged to fall onto the inclined surface of No. 1 screen 165. From this screen large chips are discharged as stream 167. A mixture of small chips and meal is discharged as stream 169 onto the inclined surface of No. 2 screen 171. Small chips 123 are discharged from the upper surface of this screen. A stream 175 of meal is discharged through screen 171 to form meal pile 177 in bin 179.

The sludge-enrichment process shown in FIG. 5 is similar to FIGS. 3 and 4 in that a sludge enrichment digester is used but dissimilar from FIGS. 2, 3, and 4 in that an activated sludge basin is not used. Instead, the partially purified liquor from the float cell is sent to a municipal sewer.

Wastewater from a food processing plant passes through line 181, receives supernate through line 183, a coagulation agent through 185, compressed air through 189, and a flocculation agent through line 187 to form a mixture as feed for float cell 191.

In this cell, as air is released at atmospheric pressure, protein and fat particles are floated to the surface to form float sludge which is skimmed off and sent through line 193 to sludge enrichment digester 201 to which blood is fed as desired through line 203. Partially purified liquor from float cell 191 is discharged through line 195 to the sewer.

In sludge enrichment digester 201, into which air is admitted through line 204, a scum layer 206, a supernate layer 207, and an enriched sludge layer 208 are formed. The supernate is fed through line 183 to join line 181 and the enriched sludge is fed through line 205 to cooker 211. A bulking agent is also fed to cooker 211 through line 209. In cooker 211, as steam is admitted through line 212, the sludge and the bulking agent are tumbled, aerated, heated, and gradually moved downwardly as the sludge dries and the fats therein melt and become at least partially absorbed by the bulking agent. The mixture of dried meal and bulking agent is discharged from cooker 211 through line 213 to the inclined surface of No. 1 screen 215 from which large chips 217 are discharged. A mixture 219 of small chips and meal is discharged through the screen 215 to fall onto the inclined surface of No. 2 screen 221. From this screen, small chips 223 are discharged, and meal 225 falls onto meal pile 227 in bin 229.

Aerobic treatment basins are illustrated in each of the three embodiments discussed hereinbefore and are generally preferred. However, an anaerobic treatment basin is satisfactory, producing an anaerobic sludge which also serves to attract and absorb proteins from the food process wastewater when recycled thereto.

The following examples, run during five spring and summer months as experiments in two cookers routinely used for rendering operations in a poultry processing plant, illustrate the process of this invention in its basic embodiment.

EXAMPLE 1

A Duppes Cooker (5 feet in diameter and 12 feet in length) was loaded with float sludge and cooking was begun by admitting steam to its shell while rotating the cooker. After 9 hours, it was apparent that the material dried irregularly and clung to the cooker surfaces.

EXAMPLE 2

The cooker was cleaned and loaded with activated sludge. After 6 hours, it was apparent that the sludge dried on exposed surfaces and also clung to cooker surfaces.

EXAMPLE 3

Equal amounts of float and activated sludges were loaded into the cooker. After 6 hours of cooking, it was clear that the mixture dried unsatisfactorily in much the same way as the individual sludges.

EXAMPLE 4

A mixture of float and activated sludges was mixed with sawdust, consisting of at least 90% of ¼-inch or smaller size, at the ratio of one to two pounds of sawdust per pound of dry sludge solids. The resultant bulked mixture was cooked in the Duppes Cooker, which required 1,800–2,000 pounds of steam per hour to cook a bulked mixture containing 80% water, until a meal was produced that appeared to be substantially dry. Analytical data are given in the Table.

EXAMPLE 5

The mixing and cooking procedure of Example 4 was repeated four days later with other samples of float sludge, activated sludge, and sawdust, with the results given in the Table.

EXAMPLE 6

The mixing and cooking procedure of Example 5 was repeated nearly six weeks later with another sample of float sludge and sawdust, no activated sludge being added, with the results given in the Table.

EXAMPLE 7

The meals produced in Examples 4–6 contained 25–30% protein and 20–24% fat. An animal nutritionist, who was consulted after he had reviewed this data, determined: (a) the ratio of fat to protein in these meals was probably too high for a cattle supplement, and (b) the high wood fiber content made them of little value for hogs and poultry.

Some of the sawdust was carefully separated by hand from one of the meals and was examined for fat content. It was visually apparent that a large portion of the fat content was in the sawdust.

EXAMPLE 8

The experiments of Examples 4 and 5 were repeated eleven days later by using hardwood chips containing 90% of ⅜-inch and larger wood particles as the bulking agent. The wood chips had a fat content of 0.41% by weight and a heating value of 6,370 Btu/pound. The bulked mixture was cooked until it appeared to be satisfactorily dry and flowable. When the wood chips were screened from the meal, the chips were found to have 9,827 Btu/pound and 16.02% fat by weight. The meal was analyzed and found to contain 20.68% fat and 50.08% protein, as set forth in the Table.

EXAMPLE 9

Additional float sludge and activated sludge were mixed with wood chips to form a bulked mixture which was cooked the day after the cook of Example 8. The screened-out chips had a fat content of 15.35% and a heat content of 9,363 Btu/pound. The meal had 12.40% moisture, 14.86% fat, 53.17% protein, 76–77% digestibility, and 14.7% free fatty acids. Additional information is given in the Table.

EXAMPLE 10

Float sludge and activated sludge were mixed with wood shavings to form a bulked mixture which was cooked twelve days after the cook of Example 9, until satisfactory in general appearance. The mixture of meal-coated shavings and meal was then screened, as in the previous examples, through a No. 1 screen having ¼-inch openings and then through a No. 2 screen having 1/16-inch openings. The shavings had a fat content of 17.97% by weight. The meal had 4.23% moisture, 16.0% fat, and 56.71% protein, as given in the Table.

EXAMPLE 11

Another cook with wood chips, ten days after the cook of Example 10 and conducted in the same manner, produced 20.86% fat and 54.19% protein as given in the Table.

EXAMPLE 12

A cook of both sludges with wood chips, one week after the cook of Example 11, produced a meal having 20.38% fat and 53.79% protein, as given in the Table.

EXAMPLE 13

On the same day, a cook of both sludges with hardwood shavings produced a meal having 12.24% fat and 50.29% protein, as given in the Table.

EXAMPLE 14

On the next day, a cook of both sludges with wood chips produced a sludge meal having 21.05% fat and 51.09% protein, as given in the Table.

EXAMPLE 15

On the following day, a cook of both sludges with wood chips produced a meal having 22.23% fat and 44.35% protein, as given in the Table.

EXAMPLE 16

About two weeks later, a cook of both sludges with wood chips produced a meal having 17.58% fat and 46.13% protein, as given in the Table.

EXAMPLE 17

About one month later, a cook of both sludges with wood chips produced a meal having 20.36% fat and 51.56% protein, as given in the Table.

| EX. NO. | MATERIAL ANALYZED | MOISTURE WGT. % | FAT WGT. % | PROTEIN WGT. % | ASH WGT. % | FIBER WGT. % |
|---|---|---|---|---|---|---|
| 4 | Both sludges and sawdust | 4.62 | 21.74 | 35.01 | 3.65 | — |
| 5 | Both siudges and sawdust | 9.48 | 20.46 | 30.70 | 2.95 | — |
| 6 | Float sludge and sawdust | 3.49 | 34.21 | 18.97 | — | — |
| 8 | Meal | 5.35 | 20.68 | 50.08 | 6.96 | 8.1 |
| 9 | Meal | 12.40 | 14.86 | 53.17 | 4.79 | 2.9 |
| 10 | Meal | 4.23 | 16.00 | 56.17 | 3.11 | — |
| 11 | Meal | 6.85 | 20.86 | 54.19 | 5.59 | — |
| 12 | Meal | 10.40 | 20.38 | 53.79 | 4.73 | — |
| 13 | Meal | 12.68 | 12.24 | 50.29 | 3.49 | — |
| 14 | Meal | 15.18 | 21.05 | 51.09 | 4.91 | — |
| 15 | Meal | 13.03 | 22.23 | 44.35 | 5.38 | — |
| 16 | Meal | 6.83 | 17.58 | 46.13 | 6.83 | — |
| 17 | Meal | 9.09 | 20.36 | 51.56 | — | — |

Because it will be readily apparent to those skilled in the wastewater treatment art that innumerable variations, modifications, applications, and extensions of the principles hereinbefore set forth can be made without departing from the spirit and the scope of the invention, what is defined as such scope and is desired to be protected should be measured, and the invention should be limited, only by the following claims.

What is claimed is:

1. A conversion process for producing an animal feed supplement of high protein content and adequately low fat content from the wastewater of a proteinaceous food preparation plant, comprising the following steps:
   A. producing, by successive admixture of a coagulation agent, compressed air, and a flocculation agent with said wastewater and then by air flotation of said admixed wastewater:
      (1) a float sludge, which contains protein and is high in sludge fat, and
      (2) a partially purified wastewater;
   B. producing an activated sludge from said partially purified wastewater;
   C. mixing said float sludge with said activated sludge and a bulking agent to form a bulked mixture;
   D. heating and drying said bulked mixture, while absorbing a portion of said sludge fat with said bulking agent, to form a dried mixture in which the dried and partially defatted sludges are in the form of a meal which adheres at least partially to said bulking agent; and
   E. separating said meal from said fat-containing bulking agent and recovering said meal which has utility as said animal feed supplement.

2. The conversion process of claim 1, wherein said activated sludge is sent to a drying bed and reduced in moisture content by about 65–70% before said mixing of said Step C.

3. The conversion process of claim 1, wherein said float sludge is produced by successively admixing a coagulation agent, compressed air, and a flocculation agent with said wastewater.

4. The conversion process of claim 3, wherein:
   A. air is bubbled through said float slude until said float sludge has been digested by microorganisms;
   B. said float sludge is settled to produce a digested float sludge, as a bottom layer, and a supernate layer; and
   C. said bottom layer is discharged as enriched float sludge and is admixed with said bulking agent.

5. The conversion process of claim 4, wherein said supernate is admixed with said wastewater before said admixing with said coagulation agent.

6. The conversion process of claim 5, wherein said digesting of said float sludge is performed as a batch enrichment process and approximately one-half of said bottom layer is admixed with said bulking agent and approximately one-half of said supernate layer is admixed with said wastewater, said remainder of said bottom layer and said remainder of said supernate layer being admixed with another quantity of said float sludge for beginning said next successive batch.

7. The conversion process of claim 6, wherein blood is added to said float sludge at the beginning of said batch enrichment process.

8. The conversion process of claim 6, wherein said activated sludge is recycled to said wastewater for admixing with said wastewater before said admixing of said coagulation agent.

9. The conversion process of claim 8, wherein said activated sludge absorbs dissolved proteinaceous material from said wastewater and is flocculated with said protein and said sludge fat to become a part of a protein-rich float sludge.

10. The conversion process of claim 9, wherein blood is also added to said wastewater before said coagulation agent is added, said blood being absorbed by said activated sludge.

11. The conversion process of claim 1, wherein said activated sludge is recycled for admixing with said wastewater before said admixing with said coagulation agent.

12. The conversion process of claim 11, wherein said recycled activated sludge absorbs dissolved proteinaceous materials from said wastewater and is flocculated with said protein and said sludge fat to become a part of a protein-enriched float sludge for admixture with said bulking agent.

13. The conversion process of claim 12, wherein blood is also added to said wastewater before said coagulation agent is added, said blood being absorbed by said activated sludge.

14. The conversion process of claim 1, wherein said bulking agent is a material which is:
A. capable of separating and aerating said bulked mixture during said heating and drying;
B. able to absorb a portion of said sludge fat; and
C. capable of being separated from said dried and partially defatted sludges.

15. The conversion process of claim 14, wherein said bulking agent is selected from a group consisting of an inorganic material and an organic material.

16. The conversion process of claim 15, wherein said bulking agent is an inorganic material selected from the group consisting of chips of about ⅜-inch in size of sandstone, pumice, tuff, and brick and aluminum oxide balls of at least about ⅜-inch in diameter.

17. The conversion process of claim 14, wherein said bulking agent is organic material selected from the group consisting of wood chips, wood shavings, whole corn cobs, broken corn cobs, bulk peanut hulls, rice hulls, soybean hulls, paunch manure, nut hulls, and cloth scraps made of absorptive fibers.

18. A protein-enrichment process for converting float sludge into a nutritional animal feed supplement and for biologically altering the proportion of fat to protein in said float sludge, comprising the following steps:
A. admixing a food process wastewater with a supernate, a coagulation agent, compressed air, and a flocculation agent for forming a pressurized liquid mixture;
B. releasing the pressure on said pressurized liquid mixture, whereby small bubbles of air float protein and fat particles to the surface of said liquid mixture, and skimming said risen particles to form said float sludge;
C. bubbling air through said float sludge until said float sludge has been digested by microorganisms;
D. settling the digested float sludge to produce a bottom layer of sludge and a layer of supernate;
E. recycling said supernate for admixing with said food process wastewater of said Step A;
F. discharging said digested sludge layer as an enriched float sludge containing large amounts of protein and fat;
G. admixing said enriched float sludge with a bulking agent to form a bulked mixture;
H. heating, aerating, and drying said bulked mixture while absorbing a portion of said sludge fat with said bulking agent; and
I. separating the dried and partially defatted sludges from the fat-containing bulking agent to produce a meal having utility as said animal feed supplement.

19. The process of claim 18, wherein blood is added to said float sludge in said Step C.

20. The process of claim 18, wherein:
A. said skimming of said Step B leaves a liquid as partially purified wastewater;
B. said liquid is fed to a biological treatment system which produces a biological sludge; and
C. a portion of said biological sludge is recycled to said food process wastewater for admixing therewith before admixing with said flocculation agent in said Step A of claim 19.

21. The process of claim 20, wherein blood is additionally admixed with said food process wastewater before said admixing of said flocculation agent.

22. The process of claim 20, wherein said biological treatment system is a barrier oxidation ditch producing activated sludge as said biological sludge.

23. The process of claim 20, wherein said biological treatment system is an anaerobic system producing an anaerobic sludge as said biological sludge.

24. In a wastewater flotation process for treating a food wastewater containing fat and proteins to produce float sludge, the improvement comprising the addition of a material selected from the group consisting of activated sludge, anaerobic sludge, and digested supernate before introducing air under pressure, coagulation chemicals, and flotation chemicals, whereby additional protein enrichment of said float sludge occurs.

25. The improved flotation process of claim 24, wherein blood is additionally added to said food wastewater before said air, coagulation chemicals, and flotation chemicals are added.

26. In a process for disposal of a wastewater from a proteinaceous food preparation plant,
wherein: (a) as a pretreatment, said wastewater is admixed with a coagulation agent, compressed air, and a flocculation agent and is then admitted to a flotation cell at atmospheric pressure, whereby proteins and fats are brought to the liquid surface and are skimmed to produce a float sludge which has a low solids content, contains protein, and is high in sludge fat, and a partially purified wastewater which is aerobically digested in an activated sludge basin to produce an activated biological sludge and a clarified liquor, said activated biological sludge having a solids content of about 3–5% solids by weight after thickening thereof, and
(b) there is a need for a process for disposal of said sludges and particularly a need for a process capable of converting said sludges into an animal feed supplement of high protein content and adequately low fat content,
the improvement which comprises:
A. admixing said float sludge and said activated sludge with a bulking agent to form a bulked mixture, said bulking agent having properties rendering it capable of:
(1) dispersion of said sludges onto its surfaces, to form sludge coatings thereon, during stirring of said bulked mixture,
(2) absorbing liquefied fat from said sludge coatings, and
(3) being separable from said sludge coatings after drying thereof;

B. stirring, heating, and aerating said bulked mixture while:
(1) liquefying said fat in said sludge coatings,
(2) absorbing a portion of said liquefied fat into said bulking agent, and
(3) drying said mixture to form a dried mixture in which the dried and partially defatted sludges exist as said dried sludge coatings; and C. separating said dried sludge coatings from said fat-containing bulking agent and recovering said sludge coatings as said meal having utility as said animal feed supplement.

27. A process for biological oxidation of fat and its conversion to biomass in a float sludge, which is produced by dissolved-air flotation of wastewater from a meat processing plant after admixture of a flotation agent, compressed air, and a coagulation agent and subsequent depressurization of said admixed wastewater, in order to increase: (a) the settleability of said float sludge and the consequent concentration of sludge solids and (b) the protein-fat ratio in said float sludge, said process comprising:

A. providing said sludge with a biological culture;

B. continuously aerating said cultured sludge for a plurality of days in a sludge enrichment digester having sufficient depth for settlement therewithin;

C. allowing said aerated sludge to settle when a desired protein-fat ratio is reached; and D. withdrawing settled sludge, as an enriched float sludge, from the bottom of said digester and supernate from a portion of said digester above said settled sludge.

28. The process of claim 27, wherein blood is added to said sludge being aerated in said step B, whereby said protein-fat ratio is further increased.

29. The process of claim 28, wherein at least a portion of said supernate is fed to an activated sludge basin which produces activated sludge.

30. The process of claim 29, wherein at least a portion of said activated sludge is recycled and added to said wastewater before said compressed air is fed thereto, whereby said recycled activated sludge furnishes biomass onto which said blood and other dissolved proteins are adsorbed.

31. The process of claim 30, wherein blood is selectively added to said sludge enrichment digester and the proteins in said blood are attached to said biomass.

32. The process of claim 27, wherein said supernate is added to said wastewater before compressed air is fed thereto, whereby said supernate provides a means for withdrawing additional dissolved proteins from said wastewater and for incorporating said additionally withdrawn proteins in said float sludge.

33. The process of claim 32, wherein blood is selectively added to said wastewater, and the proteins in said blood are withdrawn by said supernate and incorporated in said float sludge.

* * * * *